(12) United States Patent
Mikan et al.

(10) Patent No.: US 7,979,514 B2
(45) Date of Patent: Jul. 12, 2011

(54) METHOD AND SYSTEM FOR APPLICATION PROVISIONING

(75) Inventors: Jeffrey Mikan, Atlanta, GA (US); John Lewis, Lawrenceville, GA (US); Kenneth J. Diprima, Jr., Roswell, GA (US); Justin McNamara, Atlanta, GA (US); Fulvio A. Cenciarelli, Suwanee, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 284 days.

(21) Appl. No.: 12/259,173

(22) Filed: Oct. 27, 2008

(65) Prior Publication Data

US 2010/0106835 A1 Apr. 29, 2010

(51) Int. Cl.
*G06F 15/16* (2006.01)
*H04M 3/42* (2006.01)
(52) U.S. Cl. ............ 709/220; 709/226; 455/414.1
(58) Field of Classification Search .......... 709/220–232; 455/414.1
See application file for complete search history.

(56) References Cited

U.S. PATENT DOCUMENTS

| | | | |
|---|---|---|---|
| 7,757,214 B1 * | 7/2010 | Palczak et al. | 717/121 |
| 2003/0009754 A1 * | 1/2003 | Rowley et al. | 717/177 |
| 2003/0163807 A1 * | 8/2003 | Drake et al. | 717/174 |
| 2007/0042756 A1 * | 2/2007 | Perfetto et al. | 455/412.1 |
| 2007/0192253 A1 | 8/2007 | Gill et al. | |
| 2007/0263798 A1 | 11/2007 | Dewing et al. | |
| 2008/0034396 A1 * | 2/2008 | Lev | 725/118 |
| 2008/0134049 A1 * | 6/2008 | Gupta et al. | 715/738 |
| 2008/0147530 A1 * | 6/2008 | Kwan et al. | 705/34 |
| 2008/0163318 A1 * | 7/2008 | Chen et al. | 725/109 |
| 2009/0094599 A1 * | 4/2009 | Larcombe | 717/177 |
| 2009/0318123 A1 * | 12/2009 | Normark et al. | 455/414.4 |

FOREIGN PATENT DOCUMENTS

WO 2007003045 A1 1/2007

OTHER PUBLICATIONS

Stefanik et al., "Method and Apparatus for Creating Webpages in a Media Communication System", 43 pages; U.S. Appl. No. 12/198,608, filed Aug. 26, 2008.

* cited by examiner

*Primary Examiner* — Yasin Barqadle
(74) *Attorney, Agent, or Firm* — Ed Guntin; Guntin Meles & Gust, PLC

(57) ABSTRACT

A system that incorporates teachings of the present disclosure may include, for example, a system having a controller to compile a list of potential target users for a provisioning of an internet protocol multimedia subsystem (IMS) application existing on a source subscriber user device, filter the list of potential target users based on target subscriber subscription information, target subscriber device capability, and target subscriber identity module (SIM) capability to form a target list, and provision devices on the target list with the application after filtering. Other embodiments are disclosed.

23 Claims, 9 Drawing Sheets

200

400

600

METHOD AND SYSTEM FOR APPLICATION PROVISIONING

FIELD OF THE DISCLOSURE

The present disclosure relates generally to application provisioning.

BACKGROUND

Provisioning applications blindly for all subscribers or users on a network can unnecessarily load or even overload a network when many subscribers may not necessarily use or desire a particular application. As applications become more complex, the loading issues can correspondingly become more of an issue. Any application where an application core should be registered and where a mobile device should be registered to utilize the services enabled by the application core can cause unnecessary loading on a network when a user does not use the application or has no intention of using the application.

DETAILED DESCRIPTION

One embodiment of the present disclosure can entail a method that compiles a list of potential target users for a provisioning of an application existing on a source subscriber user's device, filters the list of potential target users based on target subscriber subscription information, filters the list of potential target users based on target subscriber device capability, filters the list of potential target users based on target subscriber identity module (SIM) capability, and provisions the application on devices for a remaining list of target users after filtering.

Another embodiment of the present disclosure can entail a computer-readable storage medium having computer instructions for compiling a list of potential target users for a provisioning of a multimedia application existing on a source device, filtering the list of potential target users based on target subscriber information, target subscriber device capability, target subscriber identity module (SIM) capability to form a target list of subscribers, and provisioning with the multimedia application on devices for the target list after filtering.

Yet another embodiment of the present disclosure can entail a system comprising a controller to compile a list of potential target users for a provisioning of an application existing on a source subscriber user's device based on source subscriber user behavior, filter the list of potential target users based on target subscriber subscription information, target subscriber device capability, and target subscriber identity module (SIM) capability to form a target list, and provision with the application on devices for the target list after filtering.

Yet another embodiment of the present disclosure can entail a system having a controller to compile a list of potential target users for a provisioning of an internet protocol multimedia subsystem (IMS) application existing on a source subscriber user device, filter the list of potential target users based on target subscriber subscription information, target subscriber device capability, and target subscriber identity module (SIM) capability to form a target list, and provision devices on the target list with the application after filtering.

Figure 1:
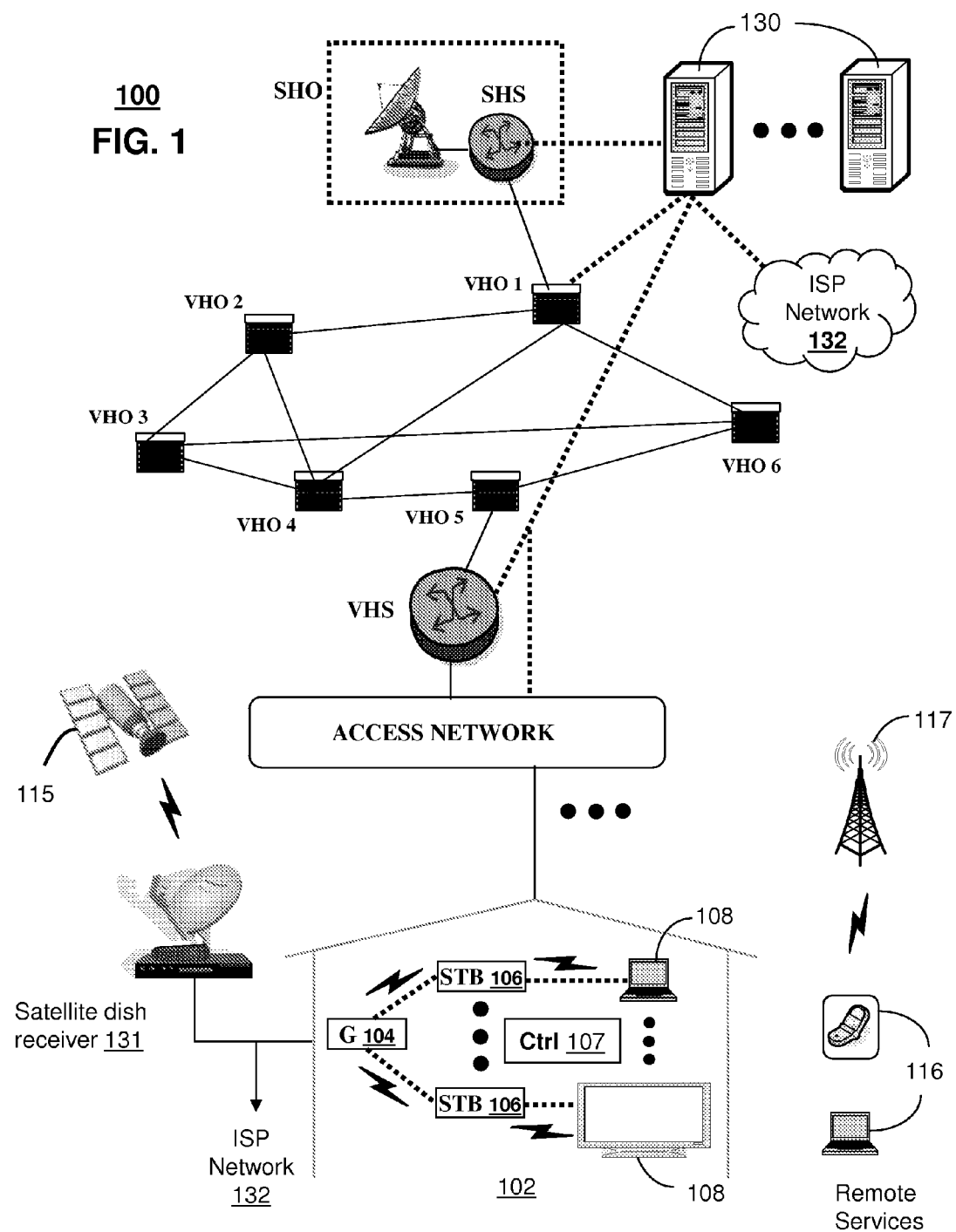
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (such as a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (such as an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (such as GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
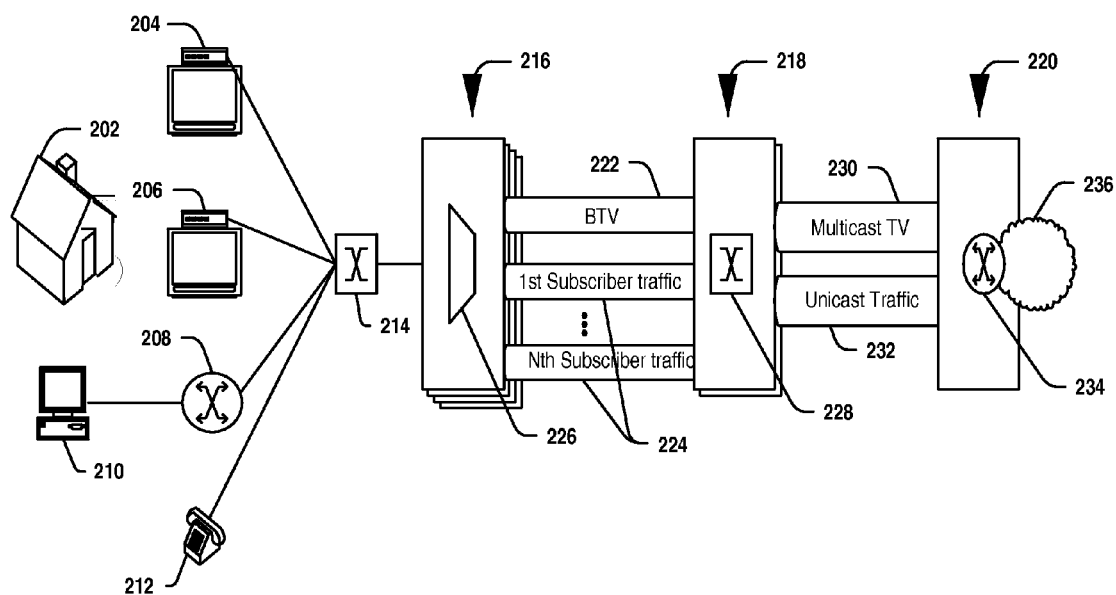

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
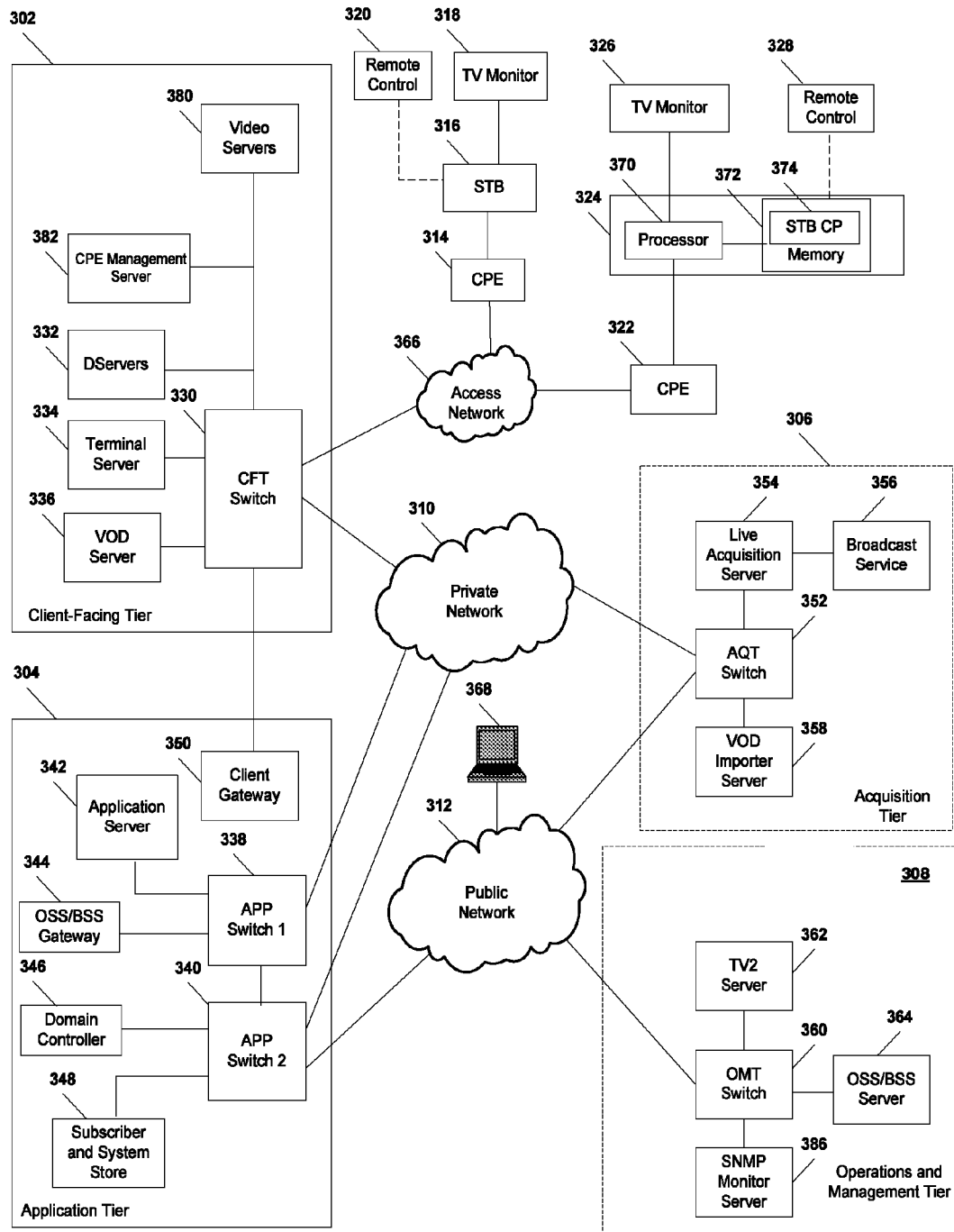

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330.

The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
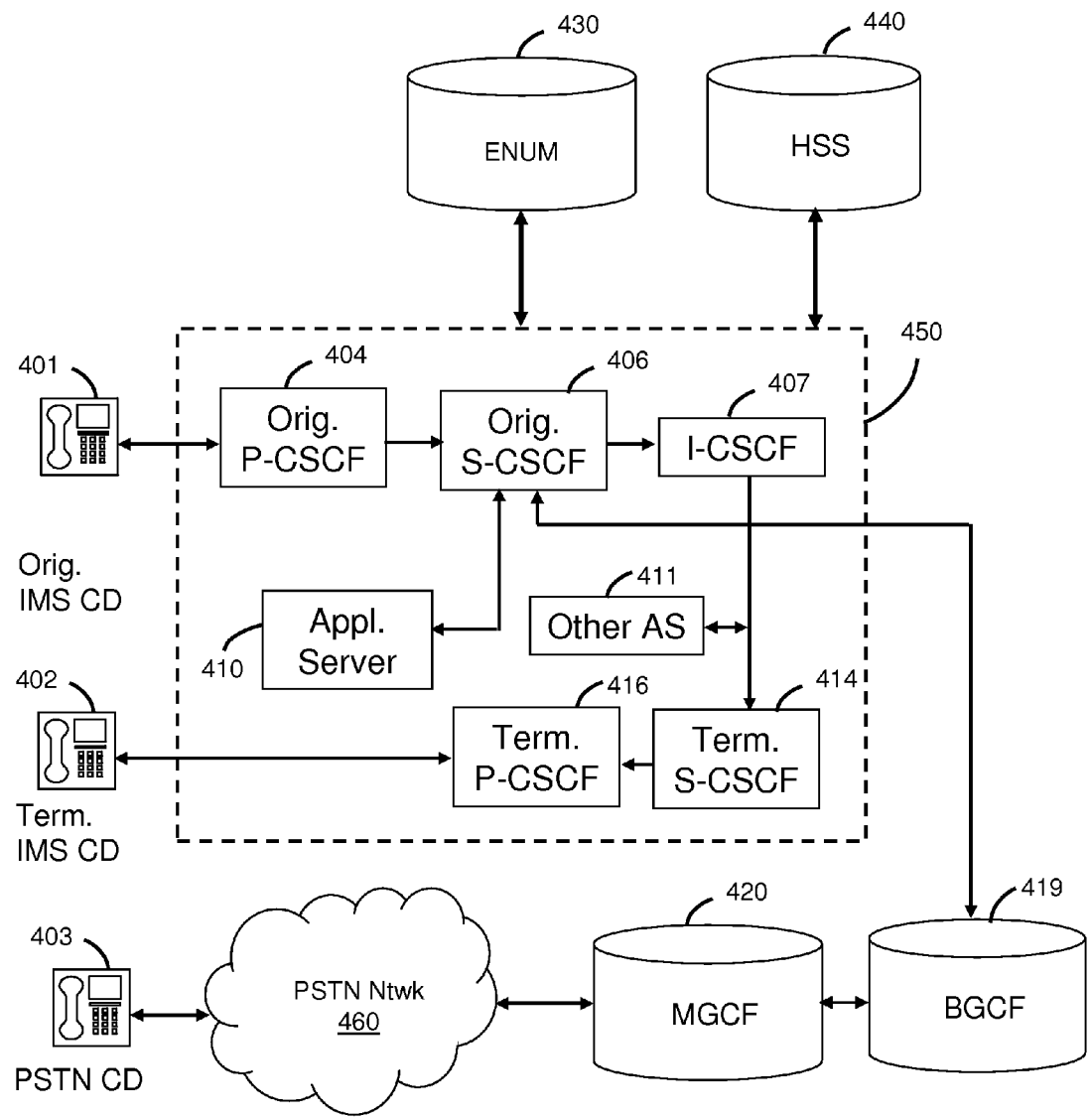

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (such as *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
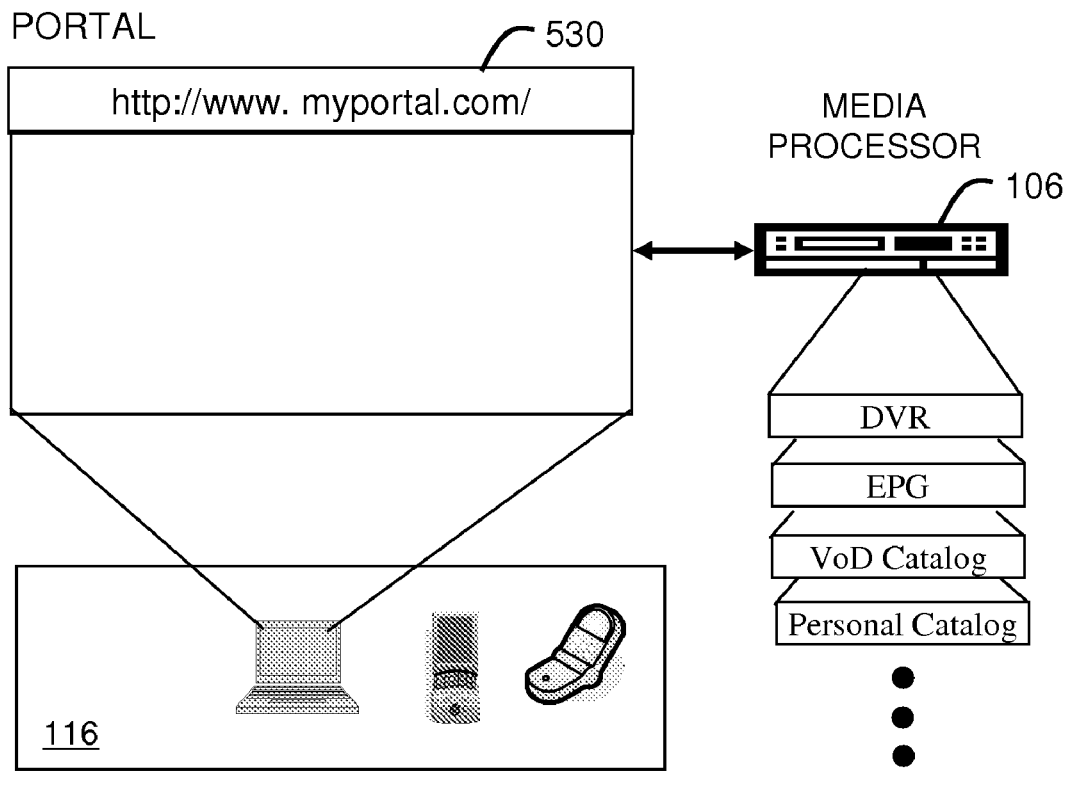
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog (such as personal videos, pictures, audio recordings, etc.) stored in the STB, a personal computer or server in a user's home or office, and so on.

Figure 6:
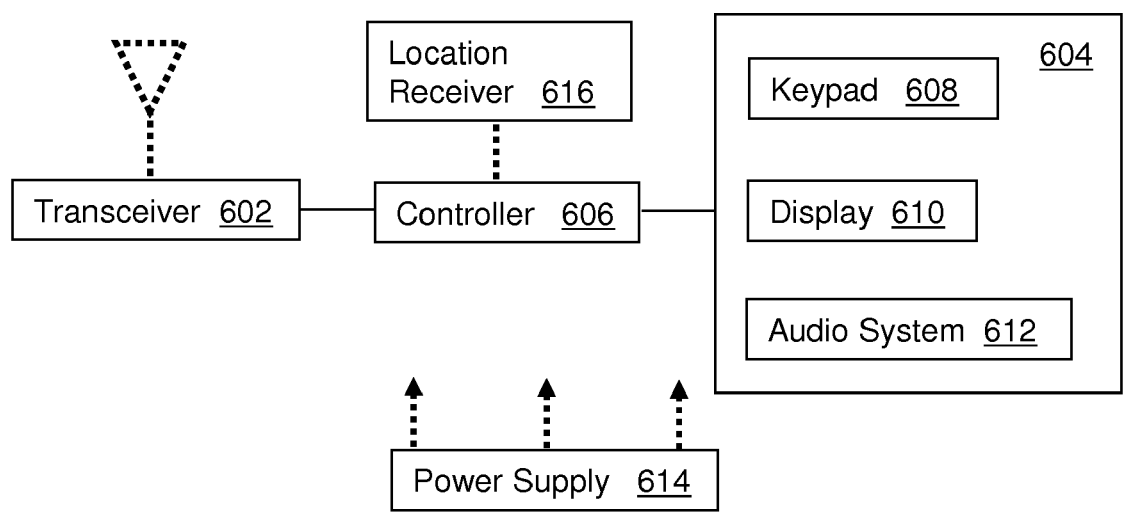
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, a location receiver 616, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (such as a USB) or a wireless interface supporting for example Bluetooth. The keypad 608 can represent a numeric dialing keypad commonly used by phones, and/or a Qwerty keypad with alphanumeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (such as audio heard only in the proximity of a human ear) and high volume audio (such as speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The location receiver 616 utilize common location technology such as a global positioning system (GPS) receiver for identifying a location of the communication device 100, thereby facilitating common location services such as navigation. The controller 606 can utilize computing technologies such as a microprocessor and/or digital signal processor (DSP) with associated storage memory such a Flash, ROM, RAM, SRAM, DRAM or other storage technologies.

Figure 7:
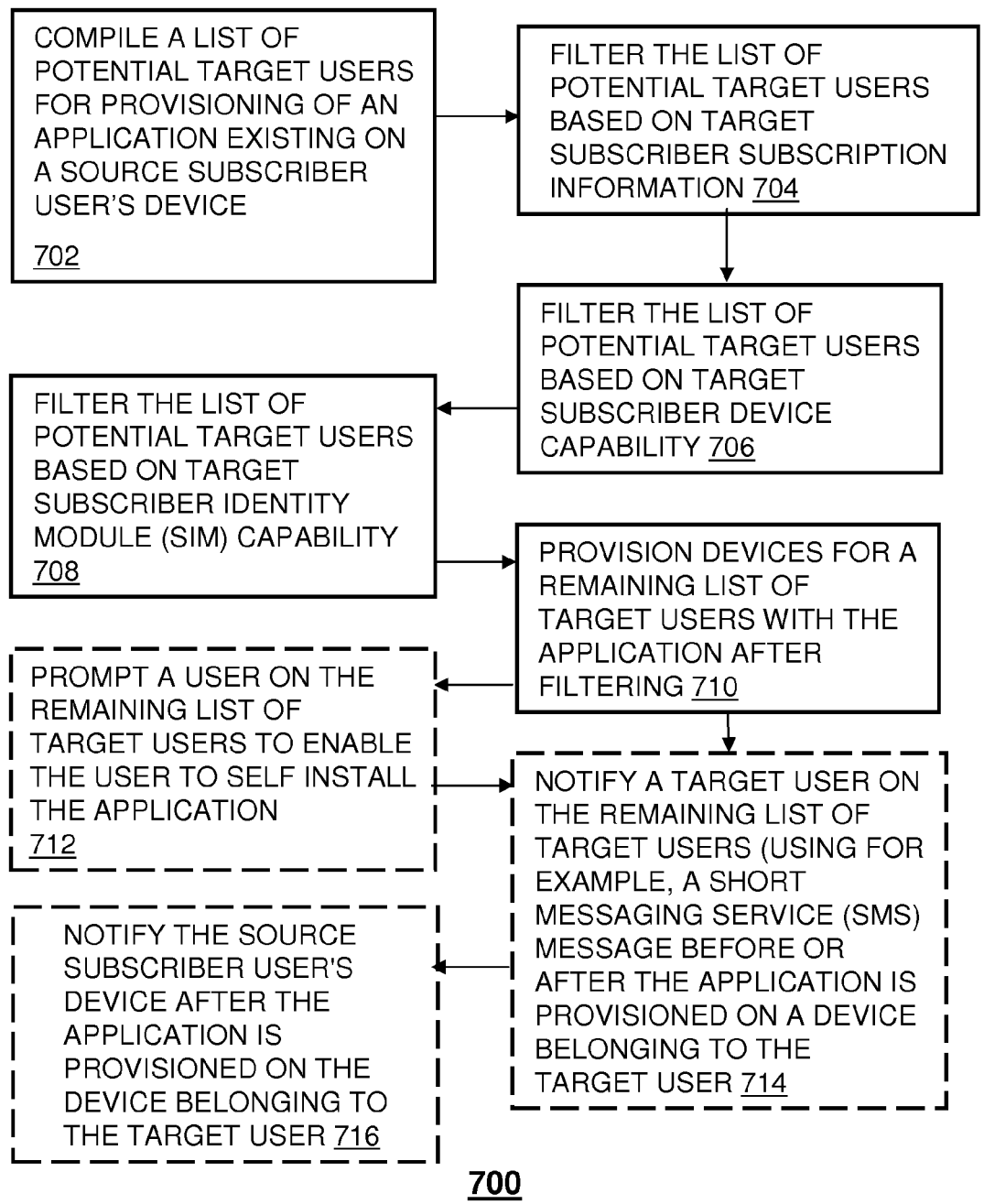
FIG. 7 depicts an illustrative embodiment of a method operating in portions of the communication systems of FIGS. 1-4.

FIG. 7 depicts an illustrative method 700 operating in portions of communication systems 100-400. Method 700 begins with step 702 in which the method compiles a list of potential target users for a provisioning of an application existing on a source subscriber user's device. For example, list of potential target users can be compiled based on a source subscriber's attempt at using an application or based on a source subscriber's previous behavior on using an application. The method can then filter the list of potential target users in a number of ways to obtain a target list or a remaining list of target users. In this particular embodiment, a first filter can limit the list of potential target users based on target subscriber subscription information at 704, a second filter at 706 can filter the list of potential target users based on target subscriber device capability, and a third filter can limit the list of potential target users based on target subscriber identity module (SIM) capability at 708. The method can filter the list of potential users based on target subscriber subscription information by comparing information from the source subscriber user's device with information on an enterprise directory. The method can also filter the list of potential users based on target subscriber device capability by comparing information from the source subscriber user's device with information on device list on a remote server or with information at a master integrated database. The method can also filter the list of potential users based on target SIM capability by comparing information from the source subscriber user's device with information on a remote server containing SIM capability for potential target users. The method 700 can then provision devices for the remaining list of target users with the application at 710.

Upon reviewing the aforementioned embodiments, it would be evident to an artisan with ordinary skill in the art that said embodiments can be modified, reduced, or enhanced without departing from the scope and spirit of the claims described below. For example, note that the application that is provisioned can be any number of applications including, but not limited to, an internet protocol multimedia subsystem (IMS) application for sharing video and audio. Also, the application can be automatically provisioned on the target devices or can be provisioned by enabling a user to self install the application at step 712. The target user can optionally be notified either before or after the application is provisioned on the device belonging to the target user at 714. The notification can be done in a number of ways using various messaging systems such as a system using short messaging service or SMS messaging. The source subscriber user's device can also be notified at 716 after the application is provisioned on the device belonging to the target user.

Other suitable modifications can be applied to the present disclosure without departing from the scope of the claims below. Accordingly, the reader is directed to the claims section for a fuller understanding of the breadth and scope of the present disclosure.

Figure 8:
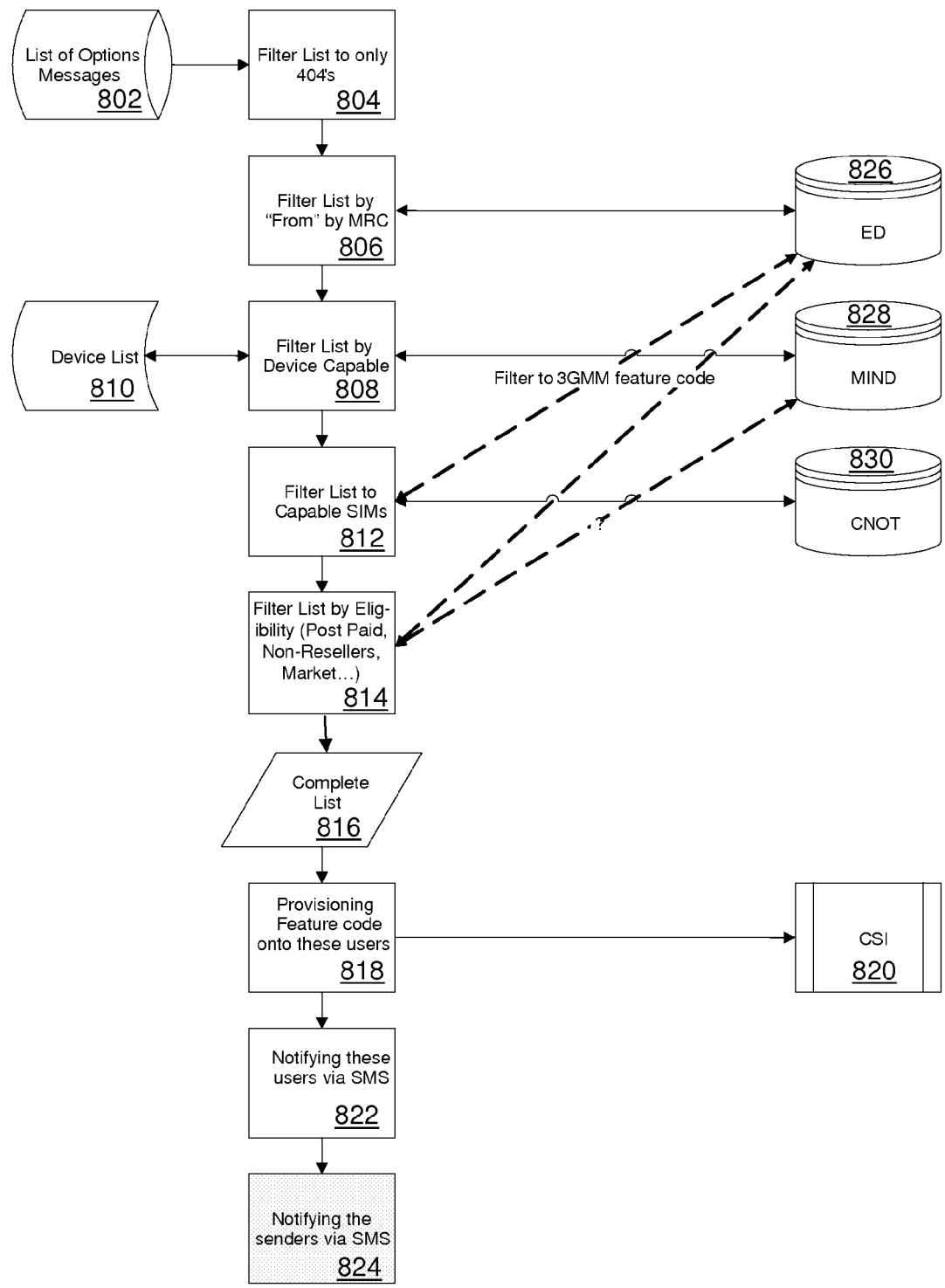
FIG. 8 depicts another illustrative embodiment of a method operating in portions of the communication systems of FIGS. 1-4.

FIG. 8 depicts a system flow or method 800 that provisions an application such as an IP Multimedia Subsystem (IMS) application the enables the delivery of internet protocol (IP) multimedia to mobile users. Such a system can use databases or repositories of information that can be stored in remote servers or in some instances locally on a user's devices. In this embodiment, some of the remote servers or databases can include an Enterprise Directory (ED) 826 that contains subscriber data and rate plans, a Master Integrated Database (MIND) 828 that contains not only a subscriber depository, but information concerning pre-paid plans and generally has a network focus, a server or repository 810 contain a device list, a server 830 that contains SIM card information and enables over the air provisioning of handsets and SIM cards.

More particularly with this embodiment at 802, a list of option messages related to an application such as "video share" or IMS services is forwarded to a number of filtering systems to ultimately create a list of users that can be "virally" infected or provisioned with applications such as video share in a manner that is unobtrusive from a network standpoint and efficient by installing applications on devices where they will most likely be used by their owners based on their historical usage of their devices and based on other factors that are for the most part determined by filtering functions. Although the filters are shown in a certain order, such order is not implied and it should be understood that the order of many of these filters can be done differently based on network configurations and other considerations. A list of devices or users is initially screened by a filter that determines whether such users and devices are on a compatible network. Such users may not be found and will get filtered out by filter 804. Another filter may be based on whether a subscriber pays a monthly recurring charge (MRC) or is a pre-paid subscriber using filter 806 and making reference to the enterprise directory 826. Another filter 808 can determine if a user's device is even capable of the application or functionality to be provisioned. The filter 808 may make reference to a device list maintained at the server 810 or the master integrated database 828 to determine if the device has or is capable of the appropriate feature. Further filtering at filter 812 can be done to determine if a device's Subscriber ID Module or SIM is capable of the desired application and such filter can refer and compare information stored at server 830 for example. Another filter 814 can filter user and devices by eligibility. The system may be set up to deny (or allow) post paid users, resellers, or particular markets or enterprises. Other filters can be devised as necessary to provision the appropriate target audience within a particular network to ultimately come up with a complete list 816 of devices or users that will be provisioned in a viral manner as contemplated herein. In one embodiment, the users on the list 816 can be provisioned automatically at step 818. Optionally, the users or owners of the "infected" devices being provisioned with a new application will be notified at step 822 using the SMS messaging system or other messaging or notification system. The recipients of the "infection" in this instance will be provisioned with a Video Share application which will allow them to share video and audio with their friends and acquaintances, but as noted above, the application that can be provisioned are not limited to Video Share. Likewise, once the recipient has been successfully "infected" or provisioned with a new application, the sender can also be notified at step 824 so that the send and recipient can begin taking advantage of the newly provisioned application. Collaborative or interactive programs that are large and not necessarily used across a broad spectrum of users may be viewed as ideal candidates for provisioning in this manner, but other programs can certainly be provisioned in this manner as well. Some users that are concerned about automatic provisioning can also have the option to perform a "consumer self-install" (CSI) at step 820 as well.

As services grow in complexity, services should be provisioned for the user prior to the user using the service, but automatic provisioning all these applications can unnecessarily load or overload network elements to support users that are provisioned (and maybe logged in) but not necessarily using the service or having no plans to use the service. One good example of such an application can be IMS. For IMS users, the IMS core has to be registered and the phone has to register and stay registered for all IMS services. The embodiments herein remove the blind automatic provisioning and only provisions users who are more likely to use the service. Several of the embodiments herein are generally focused around using existing users to "infect" their friends when they start using an application and infect their friends. The infection can involve auto provisioning for a Pay-Per-Use service or can involve prompted provisioning or any other application or service as contemplated herein. The provisioning can also include steps to personalize the "infection" process. For example, the provisioning of an IMS application can include or begin with the attaching of a snip-it of a video that indicates one friend is inviting another friend to use the provisioned application.

Figure 9:
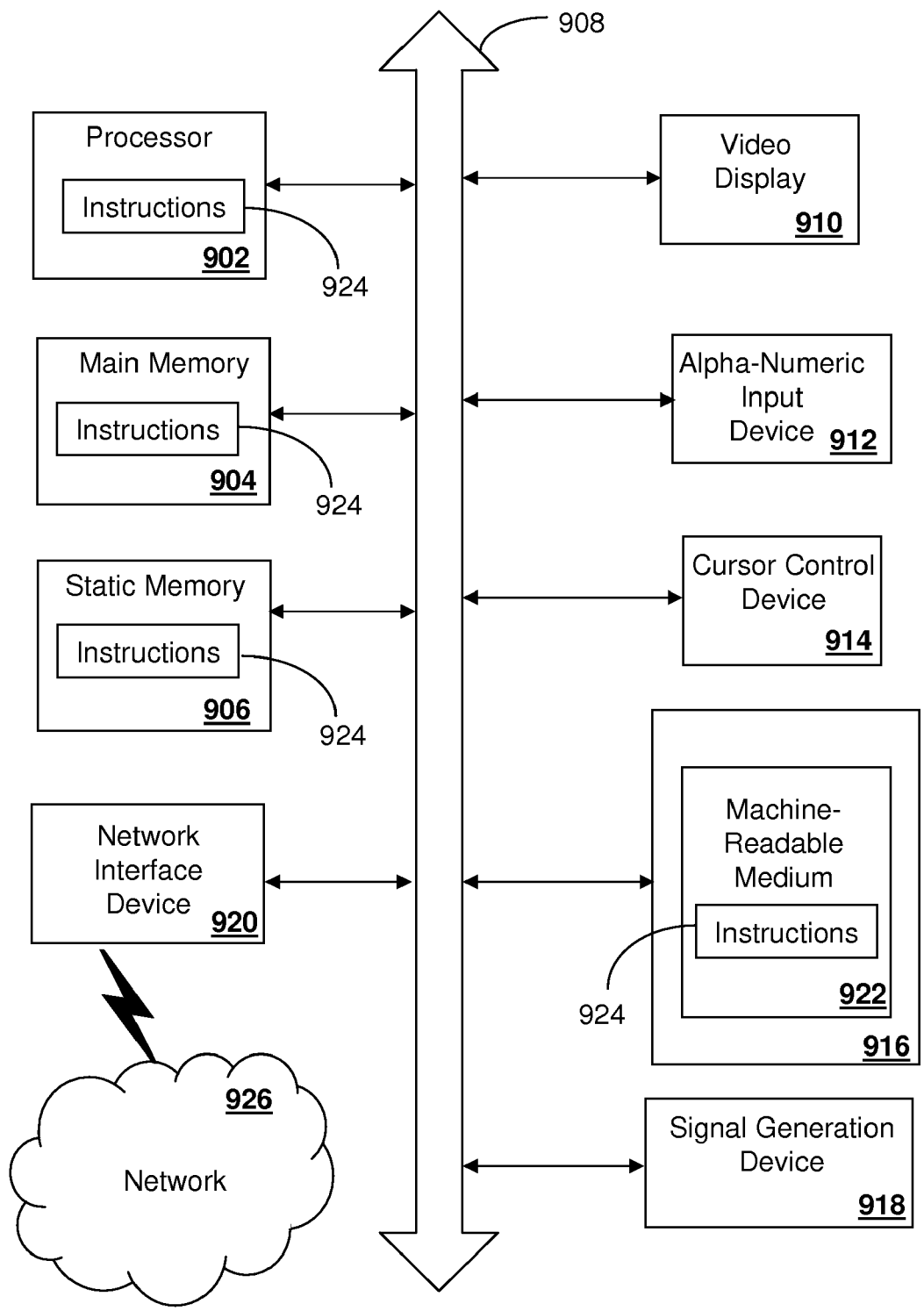
FIG. 9 is a diagrammatic representation of a machine in the form of a computer system within which a set of instructions, when executed, may cause the machine to perform any one or more of the methodologies discussed herein.

FIG. 9 depicts an illustrative diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (such as a central processing unit (CPU)), a graphics processing unit (GPU, or both), a main memory 904 and a static memory 906, which communicate with each other via a bus 908. The computer system 900 may further include a video display unit 910 (such as a liquid crystal display (LCD)), a flat panel, a solid state display, or a cathode ray tube (CRT). The computer system 900 may include an input device 912 (such as a keyboard), a cursor control device 914 (such as a mouse), a disk drive unit 916, a signal generation device 918 (such as a speaker or remote control) and a network interface device 920.

The disk drive unit 916 may include a computer-readable medium 922 on which is stored one or more sets of instructions (such as software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the computer-readable medium 922 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
compiling a list of potential target users for a provisioning of an application existing on a user device of a source subscriber;
filtering the list of potential target users based on target subscriber subscription information, target subscriber device capability, and target subscriber identity module capability to generate a target list of subscribers by removing a portion of potential target users from the list of potential target users, wherein the filtering of the list comprises removing unassociated users from the list that are not associated with the source subscriber;
wherein the application is provisioned on devices associated with the target list of subscribers.

2. The method of claim 1, wherein the application comprises an internet protocol multimedia subsystem application for sharing video and audio, and wherein a message comprising video content identifying the source subscriber is provided to each of the devices associated with the target list of subscribers.

3. The method of claim 1, further comprising filtering the list of potential target users based on the target subscriber subscription information by comparing information from the user device of the source subscriber with information on an enterprise directory.

4. The method of claim 1, further comprising filtering the list of potential target users based on target subscriber device capability by comparing information from the user device of the source subscriber with information on a device list on a remote server.

5. The method of claim 1, further comprising filtering the list of potential target users based on target subscriber identity module capability by comparing information from the user device of the source subscriber with information on a remote server containing subscriber identity module capability.

6. The method of claim 1, further comprising automatically provisioning each of the devices associated with the target list of subscribers.

7. The method of claim 1, further comprising prompting a user on the remaining list of target users to enable the user to self install the application.

8. The method of claim 1, further comprising notifying a target user on the target list of subscribers using a short messaging service message before the application is provisioned on a device associated with the target user.

9. The method of claim 1, further comprising notifying a target user on the target list of subscribers using a short messaging service message after the application is provisioned on a device associated with the target user.

10. The method of claim 9, further comprising notifying the user device of the source subscriber after the application is provisioned on the device associated with the target user.

11. A non-transitory computer-readable storage medium, comprising computer instructions for:
compiling a list of potential target users for a provisioning of a multimedia application existing on a source device;
filtering the list of potential target users based on target subscriber information, target subscriber device capability, and target subscriber identity module capability to generate a target list of subscribers by removing a portion of target users from the list of potential target users, wherein the filtering of the list comprises removing unassociated users from the list that are not associated with a subscriber of the source device; and
provisioning with the multimedia application on devices associated with the target list of subscribers.

12. The non-transitory computer-readable storage medium of claim 11, further comprising computer instructions for sharing and provisioning an Internet Protocol Multimedia Subsystem application on the devices for the target list of subscribers.

13. The non-transitory computer-readable storage medium of claim 11, further comprising computer instructions for sharing and provisioning a pay-per-use service application on the devices for the target list of subscribers.

14. The non-transitory computer-readable storage medium of claim 11, further comprising computer instructions for filtering the list of potential target users based on the target subscriber information by comparing information from a source device with information on an enterprise directory, filtering based on target subscriber device capability by comparing information from the source device with information on device list on a remote server, and filtering based on target subscriber identity module capability by comparing information from the source device with information on a remote server containing subscriber identity module capability for potential target users to generate the target list of subscribers.

15. The non-transitory computer-readable storage medium of claim 11, further comprising computer instructions for notifying a target user on the target list of subscribers before the application is provisioned on a device associated with the target user.

16. The non-transitory computer-readable storage medium of claim 11, further comprising computer instructions for notifying a target user on the target list after the application is provisioned on a device belonging to the target user.

17. The non-transitory computer-readable storage medium of claim 11, further comprising computer instructions for notifying the source device after the application is provisioned on the device associated with the target user.

18. A system, comprising:
a memory device; and
a controller device to:
compile a list of potential target users for a provisioning of an application existing on a user device of a source subscriber based on behavior associated with the source subscriber;
filter the list of potential target users based on target subscriber subscription information, target subscriber device capability, and target subscriber identity module capability to generate a target list of subscribers by removing a portion of potential target users from the list of potential target users, wherein the filtering of the list comprises removing unassociated users from the list that are not associated with the source subscriber; and provision with the application on devices associated with the target list of subscribers.

19. The system of claim 18, wherein the application is an internet protocol multimedia subsystem application for sharing video and audio.

20. The system of claim 18, wherein the memory device comprises an enterprise directory that provides the target subscriber subscription information, a master integrated database that provides the target subscriber device capability, and a remote server that provides the subscriber identity module capability for potential target users.

21. The system of claim 18, wherein the controller detects potential target users from a source subscriber phonebook, a recent call list, a frequent caller list, or a social networking list stored on the user device of the source subscriber.

22. A system, comprising:
a memory device; and
a controller device to:
identify a first group of potential target users for a provisioning of an internet protocol multimedia subsystem application existing on a user device of a source subscriber;
filter the first group of potential target users based on target subscriber subscription information, target subscriber device capability, and target subscriber identity module capability to identify a second croup of potential target users by removing a portion of target users from the first group of potential target users, wherein the filtering of the list comprises removing unassociated users from the first group of potential target users that are not associated with the source subscriber; and
provision devices associated with the second croup of potential target users with the application.

23. The system of claim 22, wherein the controller identifies the first croup based on source subscriber user behavior.

* * * * *